United States Patent Office 3,262,817
Patented July 26, 1966

3,262,817
ELECTROCHEMICAL CELL ELECTRODES
Charles E. Thompson, Fanwood, N.J., assignor to Esso Research and Engineering Company, a corporation of Delaware
No Drawing. Filed Aug. 1, 1961, Ser. No. 128,393
4 Claims. (Cl. 136—121)

This application is a continuation-in-part of application, S.N. 19795, filed April 4, 1960, and now abandoned.

This invention relates to electrochemical cells for the oxidation of a combustible fuel and to novel components thereof. In particular, this invention relates to the discovery of a novel catalyst-bearing electrode for use in anodic oxidation of a combustible fuel gas or liquid, i.e. to novel electrodes comprising in combination such catalyst and an electron conductive structure. More particularly, this invention relates to catalysts and/or electrodes comprising manganese molybdate upon a carbon support for use as the fuel electrode or anode in a fuel cell or electrolytic cell employing an aqueous electrolyte.

Electrochemical cells for the oxidation of a combustible feed stock continuously supplied from an outside source are known in the art and include both fuel cells which generate electrical energy from such oxidation and electrolytic cells which must be supplied with electrical energy to effect such oxidation. The fuel cell can be operated solely as a power-producing device, or, by removing from the cell partial oxidation products; it can be employed to simultaneously produce electrical energy and valuable organic chemical products. The over-all fuel cell reaction is the sum of two essentially independent half-cell reactions. At the anode, hydrogen or a carbon-containing compound of lower oxidation state than carbon dioxide is electrochemically oxidized with a release of electrons to the anode. At the cathode oxygen is reduced with the acceptance of electrons to form hydroxyl ions, perhydroxyl ions or water, depending upon the electrolyte employed and other reaction conditions. The internal portion of the electrical circuit is completed by ion transfer through an electrolyte between such electrodes while electron transfer from anode to cathode outside such electrolyte completes the external portion of the electrical circuit.

The electrolytic cells aforementioned differ from the aforedescribed fuel cells in that electrons are supplied to a cathode therein from an external (D.C.) power source resulting in hydrogen evolution from the aqueous electrolyte and anodic partial oxidation of an organic feed stock. The products recovered from such partial oxidation are carbon-containing compounds of lower oxidation state than carbon monoxide, e.g. alcohols, carboxylic acids, ketones, etc.

The function of the fuel electrode or anode in the anodic oxidation of a combustible fuel is essentially independent of the type of cathode employed and hence an electrode suitable for effecting such anodic oxidation may be employed in either of the aforedescribed cell types. Anodic oxidation occurs where the fuel comes into dual contact with the electrolyte and the electron conductive structure which serves as the electrode. In cells which employ an aqueous electrolyte and hence operate at relatively low temperatures, e.g. from room temperature and below up to not more than about 600° F. and more commonly between about 75° F. and 300° F., catalysts are associated with the electrode to increase the rate of reaction. Obviously, where the catalyst employed is of itself a good electron conductor, one material may serve as both catalyst and conductor. However, for many reasons, e.g. cost, structural requirements and so forth, such electrodes commonly comprise an electrode base of one material which is coated or impregnated with a second material which provides the desired catalytic effect. Carbon has provided one of the more effective electrode base materials and has been found to be particularly useful for diffusion type electrodes, i.e. electrodes wherein the fuel contacts the electrolyte by diffusion through a porous structure. Carbon may also be used as a catalyst support in cells which do not employ a diffusion feeding system as where the fuel employed is soluble in the electrolyte.

In the past, various metals and simple oxides thereof have been tested for catalytic activity in association with the fuel electrode. Included among these have been such metals as copper, silver, gold and the metals of Group VIII of the Periodic Table. Some materials fail for want of catalytic activity, while others undergo chemical change to a form that is soluble and/or react with the electrolyte employed. Thus, for example, while nickel and certain other metals may resist chemical attack in a basic medium such as a hydroxide of an alkali metal, they are totally unfit for use as such in a strong acid medium where it has been found necessary to employ one or more of the so-called noble metals, e.g. platinum, gold, iridium, etc.

The effectiveness of an anodic catalyst in cells of this type is demonstrated by its ability to maintain potential with current flow from the half-cell, i.e. minimize loss of voltage with an increase in current density.

It has now been discovered that manganese molybdate provides a highly effective catalytic material for accelerating the electrochemical reaction of a combustible fuel at the fuel electrode or anode. This catalytic activity can be maintained over long periods of sustained operation in both acidic and basic electrolytes. The catalyst of this invention is employed on a carbon base or support which may form the entire electrode structure or exist merely as an outer layer or coating upon a support of other material, e.g. metal or an organic membrane.

When current is drawn from a cell some polarization, represented by voltage drop, always occurs at each electrode thereby reducing the potential between the anode and cathode. This in turn limits the power output from the cell, or, in the case of an electrolytic reactor or cell, the amount of current passing through. The relatively low polarization losses obtained with the electrodes of this invention compare favorably with those obtained with the noble metal catalysts.

Manganese molybdate is chemically inert to both basic and acidic electrolytes under the conditions of reaction employed in a fuel cell using an aqueous electrolyte. Thus the catalyst and electrodes of this invention may be employed with strong bases such as KOH, NaOH, LiOH, etc., aqueous solutions of strong acids, such as $H_2SO_4$, $H_3PO_4$, HCl, $HNO_3$, peracetic acid, etc., and with aqueous carbonate electrolytes, e.g. $K_2CO_3$–$KHCO_3$, $Na_2CO_3$–$NaHCO_3$. The hereinafter mentioned water soluble forms of manganese and molybdenum upon heat decomposition form manganese oxide and molybdena respectively. The former alone is quite soluble in strong acids and slightly soluble in strong bases while the latter alone is soluble in both. Manganese metal is soluble in acid. Manganese molybdate has proven to be a very stable catalyst over extended periods of use and is not easily poisoned as are many catalysts heretofore employed. Since the anodic half-cell reaction is essentially independent of the cathodic half-cell reaction, the electrodes of this invention may be employed with any of the fuel cell or electrolytic cell cathodes known to the art.

In the preparation of the catalyst-bearing electrodes of this invention the manganese molybdate is formed in situ upon the carbon support. By this method the carbon mass is first soaked in an aqueous solution of soluble compound of molybdenum, e.g. ammonium molybdate, molybdic acid, sodium molybdate, etc., for a period of time in the range of about 0.1 to 10, preferably 2 to 6 hours. The carbon mass is then heated gradually under inert gas, e.g. nitrogen, to a temperature above about 1000° F., e.g. in the range of 1000° F. to 1800° F., for about 0.10 to 10 hours, preferably about 2 to 6 hours, to decompose the ammonium molybdate and distribute the resulting $MoO_3$ over the surface of the carbon mass. The carbon mass is then soaked in an aqueous solution of a soluble compound of manganese, e.g. manganese acetate, manganese nitrate, manganese formate, etc., for a period of time in the range of about 0.10 to 10, preferably 2 to 6, hours, and again heated gradually to a temperature above about 1200° F., e.g. in the range of about 1200 to 2000° F. or higher under an inert gas for about 0.10 to 10, preferably 2 to 6, hours. This leaves manganese molybdate on the carbon surface. If desired, the solutions of ammonium molybdate and manganese acetate may be applied successively without an intermediate heat treatment. The treatment is carried out so as to leave manganese molybdate on the carbon surfaces in an amount such as to constitute about 1 to 30, preferably 5 to 15, wt. percent of the total electrode. Manganese molybdate formed in situ upon the carbon surface in accordance with this method is firmly affixed to the surface and extremely difficult to remove.

The preparation of carbon structures for use as electrodes or as components of catalyst-bearing electrodes is well known in the art. Conventionally such structures are prepared by admixing fine particles of graphite and calcined coke with a binder material, e.g., pitch, molded into shape under high pressures and sintered over a period of time at elevated temperatures. The porosity may then be increased as desired by heating in a carbon dioxide atmosphere which further serves to make the carbon surfaces more hydrophilic and hence more amenable to catalyst impregnation from an aqueous electrolyte.

The following examples are presented for purposes of illustration only and the details therein should not be construed as limitations upon the true scope of the invention as set forth in the claims.

EXAMPLE I

Cylindrical electrodes of porous carbon were impregnated with the catalyst of this invention in the following manner. The cylinder was first soaked in an aqueous solution of ammonium molybdate for about 6 hours. The carbon mass was then dried and subsequently heated under nitrogen gas to decompose the ammonium molybdate to form $MoO_3$ and then heated further to a temperature of about 1200° F. to distribute the $MoO_3$ over the surface of the carbon. The carbon mass was then soaked in an aqueous solution of manganese acetate for about 6 hours and again heated to a temperature of about 1400° F. under nitrogen to form manganese molybdate upon the carbon surface. The impregnated carbon mass was then ready for use in a fuel cell.

Other cylinders prepared in a like manner and having essentially the same density, tensile strength, porosity, and pore size distribution were impregnated with one of the most effective noble metal catalysts, i.e. 95% platinum and 5% gold. The platinum and gold catalyst was prepared by soaking the electrode in an aqueous solution containing chloroplatinic acid and auric chloride, decomposing the adsorbed compounds under nitrogen at about 900° F. and subsequently effecting reduction to elemental gold and platinum with hydrogen at a temperature of about 900° F.

The electrode of this invention and the platinum-gold catalyzed control were then tested as fuel electrodes or anodes in a fuel cell employing a 30 wt. percent aqueous sulfuric acid electrolyte at atmospheric pressure. The cell was operated at a temperature between about 170° to 180° F. The oxygen electrode or cathode employed was in each case a porous carbon cylinder impregnated with a platinum comprising catalyst and the oxidant employed was molecular oxygen. A saturated hydrocarbon, ethane, was chosen as the fuel to be oxidized inasmuch as such a compound provides a more severe test for catalytic activity than is provided by hydrogen, an olefin, or an oxygenated hydrocarbon feed stock, such as an alcohol. The comparative performance of the manganese molybdate impregnated electrode with the control is set forth in the following table:

*Performance of manganese molybdate electrode in anodic oxidation in acid*

[Ethane, 30% $H_2SO_4$, 1 atm. prs.]

| | Temp., °F. | Open Circuit [1] Potential, Volts | Polarization Under Load, Volts | | |
|---|---|---|---|---|---|
| | | | 1 [2] | 2 [2] | 5 [2] |
| $MnMoO_4$ on Carbon | 178 | 0.54 | 0.11 | 0.14 | 0.20 |
| Pt-Au (Control) on Carbon | 173 | 0.56 | 0.05 | 0.10 | 0.24 |

[1] Relative to Standard Hydrogen Reference.
[2] Amps./ft.[2].

This demonstrates that the manganese molybdate catalyzed carbon electrode closely approximates the anodic performance obtainable with electrodes bearing a noble metal catalyst.

EXAMPLE II

Other manganese molybdate coated carbon electrodes prepared as in Example I and consisting of about 90 wt. percent carbon and about 10 wt. percent manganese molybdate are employed as the fuel electrode in fuel cells and electrolytic cells for anodic oxidation of hydrocarbons, employing a basic electrolyte, e.g. aqueous potassium hydroxide. The electrodes are stable in such electrolyte and the catalytic activity provided is comparable to the better anodic catalysts known to the art.

EXAMPLE III

The anodic oxidation processes of Examples I and II are repeated employing in turn hydrogen, methyl alcohol, formaldehyde, and butene-2 as the combustible feed stock, highly satisfactory catalytic effect results and anodic oxidation at good reaction rates is achieved.

Reference herein to the Periodic Table refers to the 1959 edition of the Periodic Table designed by Henry O. Hubbard, revised by William F. Meggers and published by W. M. Welch Mfg. Co. of Chicago, Illinois.

What is claimed is:
1. In an electrochemical cell an anodic oxidation anode comprising manganese molybdate upon a carbon support.
2. An anode in accordance with claim 1 wherein said manganese molybdate comprises about 1 to 30 wt. percent and said carbon comprises about 70 to 99 wt. percent of the total electrode.

3. An anode in accordance with claim 1 wherein said manganese molybdate comprises about 5 to 15 wt. percent of the total electrode.

4. In an electrochemical cell employing an aqueous electrolyte, an anodic oxidation anode comprising manganese molybdate upon a carbon support.

References Cited by the Examiner

UNITED STATES PATENTS 2,572,300  10/1951  Arnold et al. _____ 252—467 X
2,691,647  10/1954  Field et al. _____ 252—467 X

FOREIGN PATENTS 675,131  7/1952  Great Britain.

OTHER REFERENCES

Mellor: Comprehensive Treatise on Inorganic and Theoretical Chemistry, volume 11.

HOWARD S. WILLIAMS, *Primary Examiner.*

JOHN R. SPECK, JOHN H. MACK, *Examiners.*

S. PARKER, W. VAN SISE, *Assistant Examiners.*